United States Patent [19]

Harigaya et al.

[11] Patent Number: 4,486,849
[45] Date of Patent: Dec. 4, 1984

[54] COMPUTER FOR CALCULATING COMPOUND INTEREST

[75] Inventors: Isao Harigaya, Yokohama; Akihiro Yamataka, Funabashi, both of Japan

[73] Assignee: Canon Kabushiki Kaisha, Tokyo, Japan

[21] Appl. No.: 426,078

[22] Filed: Sep. 28, 1982

Related U.S. Application Data

[60] Continuation of Ser. No. 190,407, Sep. 24, 1980, abandoned, which is a division of Ser. No. 6,751, Jan. 26, 1979, Pat. No. 4,276,606, which is a division of Ser. No. 777,828, Mar. 15, 1977, Pat. No. 4,149,261.

[30] Foreign Application Priority Data

Mar. 19, 1976 [JP] Japan .................................. 51-30488
Mar. 23, 1976 [JP] Japan .................................. 51-31862
Apr. 26, 1976 [JP] Japan .................................. 51-45711

[51] Int. Cl.$^3$ .............................................. G06F 15/20
[52] U.S. Cl. .................................... 364/715; 364/408; 364/709
[58] Field of Search ........................ 364/408, 709, 715

[56] References Cited

U.S. PATENT DOCUMENTS 3,863,060 1/1975 Rode et al. .......................... 364/408
3,946,218 3/1976 Rode et al. .......................... 364/408
4,099,246 7/1978 Osborne et al. ..................... 364/709

Primary Examiner—Errol A. Krass
Attorney, Agent, or Firm—Fitzpatrick, Cella, Harper & Scinto

[57] ABSTRACT

A computer capable of performing the compound interest operation of $(1+i)^n$ where $i$=interest rate and $n$=term.

8 Claims, 9 Drawing Figures

FIG. 8

| INDICATOR (CONTACT POINT) | OPERATION PLACE |
|---|---|
| DF (19) | FLOATING |
| D0 (20) | BELOW 1st DECIMAL PLACE |
| D1 (21) | BELOW 2nd DECIMAL PLACE |
| D2 (22) | BELOW 3rd DECIMAL PLACE |
| D3 (23) | BELOW 4th DECIMAL PLACE |
| D4 (24) | BELOW 5th DECIMAL PLACE |
| DIO (27) | BELOW 1st PLACE |
| DIO$^2$ (28) | BELOW 2nd PLACE |
| DIO$^3$ (29) | BELOW 3rd PLACE |
| DIO$^4$ (30) | BELOW 4th PLACE |
| DIO$^5$ (31) | BELOW 5th PLACE |

Rows DF–D4: FIRST INDICATOR
Rows DIO–DIO$^5$: SECOND INDICATOR

FIG. 9

| OPERATION<br>INDICATOR<br>(CONTACT POINT) | ROUND | RAISE | TRUNCATION |
|---|---|---|---|
| DF (19) | — | — | — |
| D0 (20) | 0.5 | 0.9 | 0 |
| D1 (21) | 0.05 | 0.09 | 0 |
| D2 (22) | 0.005 | 0.009 | 0 |
| D3 (23) | 0.0005 | 0.0009 | 0 |
| D4 (24) | 0.00005 | 0.00009 | 0 |
| DIO (27) | 5 | 9 | 0 |
| $DIO^2$ (28) | 50 | 90 | 0 |
| $DIO^3$ (29) | 500 | 900 | 0 |
| $DIO^4$ (30) | 5000 | 9000 | 0 |
| $DIO^5$ (31) | 50000 | 90000 | 0 |

COMPUTER FOR CALCULATING COMPOUND INTEREST

This is a continuation of application Ser. No. 190,407, Sept. 24, 1980, now abandoned, which was a division of Ser. No. 6,751, filed Jan. 26, 1979, now U.S. Pat. No. 4,276,606, which in turn was a division of Ser. No. 777,828, filed Mar. 15, 1977, now U.S. Pat. No. 4,149,261.

BACKGROUND OF THE INVENTION

1. Field of the Invention

The present invention relates to improvements of a computer wherein processing of input numeric data may be much facilitated.

2. Description of the Prior Art

The sequence of a date data or the sequence of a numeric data representing a year, a numeric data representing a month and a numeric data representing a day to be input to a computer is different from one country to another. For instance, in Japan the sequence is The year in Showa era, the month and the day or The year in Christian era, the month and the day. In United States and European countries, the sequence is in general The month, the day and the year in Christian era, but in England the sequence is The day, the month and the year in Christian era.

In general, with the conventional desktop computers capable of computing days and recording the date for accounting purpose, one of the above four sequences is selected and the date data must be entered in the predetermined sequence. Therefore the computers with one date data input sequence are very convenient for those in one country but are inconvenient to those in other countries. In Japan the date data input sequence is different from one office to another and in some offices Japanese date system is employed; in some offices European system or England system or both; and in some offices both the Showa era and Christian era are used. Therefore the computers with only one date data entry system are very inconvenient to those living in a country where a data is represented in four different sequences.

The conventional computers for accounting have been in general designed for solving only simple routines not for solving complex accounting problems in the banking, real estate business and the like. As a result, the mathematical tables have been widely used in order to solve the problems involving compound interest, annuity, depreciation and the like, but the mathematical tables generally do not provide all answers for all problems. In addition, the accuracy of the result obtained with the aid of the mathematical tables is greatly dependent upon the accuracy of the mathematical tables themselves and the approximation by an interpolation method used. Furthermore, without the knowledge of the mathematical tables they cannot be used at all. In other words, a training is needed before one can use them.

A calculator which is similar to those disclosed in this specification is disclosed in for instance U.S. Pat. No. 3,863,060, but its keying system is very complex so that without an adequate training no one can use it in a very efficient manner.

In accounting the obtained results must be rounded, raised or truncated or chopped. To solve this problem there has been invented and demonstrated an electronic microcomputer wherein indicator means is provided for specifying a digit position lower than the decimal point so that the digits below the specified digit position may be rounded, raised or truncated or chopped. However there arises a problem when the digits below a specified digit position higher than the decimal point must be rounded, raised or chopped. Assume that the digits lower than the N-th digit position higher than the decimal point be required to be rounded. First the first digit position lower than the decimal point must be indicated by the indication means, and the numeric data is divided by $10^N$. Thereafter a quotient must be multiplied by $10^N$. Thus the operation is very complex.

SUMMARY OF THE INVENTION

One of the objects of the present invention is therefore to provide a computer capable of processing data in a very simple manner.

Another object of the present invention is to provide a computer into which a date data may be entered in any of the four sequences described above.

A further object of the present invention is to provide a computer provided with date sequence selection means for selecting the sequence of a date data to be entered so that the date data may be entered in any of the above four sequences.

A further object of the present invention is to provide a computer incorporating a key for executing the operation of $(1+i)^n$ so that a compound interest may be obtained by only two keying operations.

A further object of the present invention is to provide a computer capable of rounding, raising or chopping the digits lower than a specified digit position above the decimal point in a very simple manner.

The above and other objects, features and advantages of the present invention will become more apparent from the following description of some preferred embodiments thereof taken in conjunction with the accompanying drawings.

According to the present invention, there is provided a computer including (a) numeric data input means for entering a numeric data into the computer, (b) identification means for identifying the status of the input numeric data, (c) memory means responsive to the signal from said identification means for storing the signal from said identification means so that the input numeric data may have a double meaning represent a dual status, and (d) processing means for executing arithmetic operation of the input numeric data in response to the contents in said memory means.

BRIEF DESCRIPTION OF THE DRAWING

FIGS. 8 and 9 are tables used for the explanation of the mode of operation of the third embodiment.

DESCRIPTION OF THE PREFERRED EMBODIMENT

Figure 1:
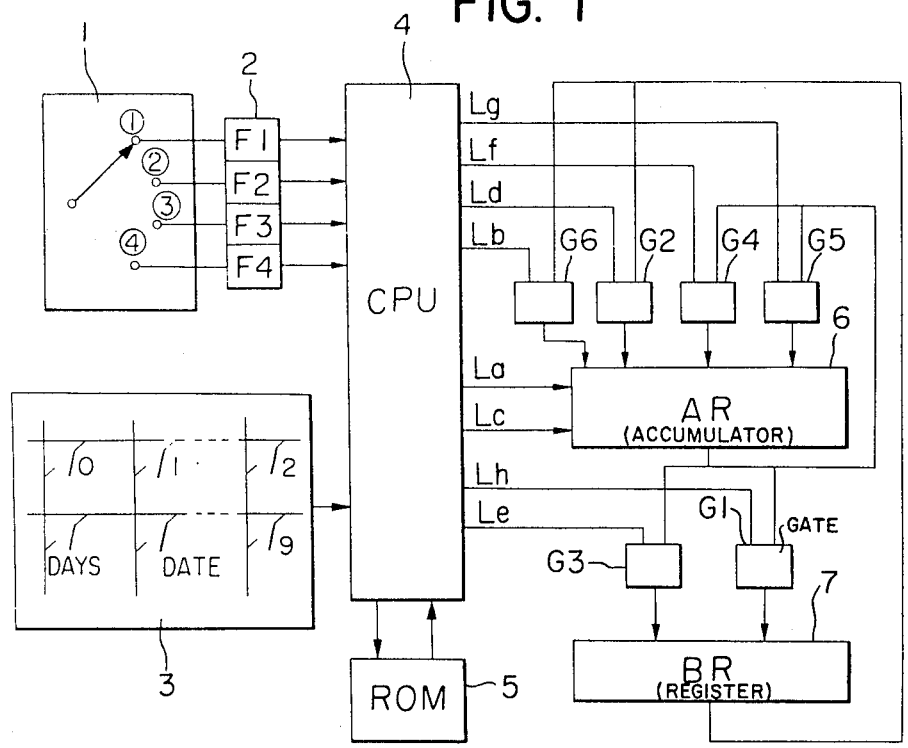
FIG. 1 is a block diagram of a first embodiment of a computer in accordance with the present invention.

First Embodiment, FIG. 1

In FIG. 1 there is shown in block diagram a computer in accordance with the present invention capable of entering the date data expressed in any of the four sequences described above. A selection switch 1 is provided for selecting one of four input sequence positions where the day, month and year are entered in the sequences shown below:

| Position | Input Sequence |
|---|---|
| ① | Year (in Showa) - - month - - day |
| ② | Year (Christian era) - - month - - day |
| ③ | Month - - day - - Year (Christian era) |
| ④ | Day - - Month - - Year (Christian era) |

A flip-flop group 2 is provided for indicating the status or selected position of the selection switch 1 and consists of four flip-flops $F_1$ through $F_4$. The computer further includes a key input device 3 for entering data, a central processing unit 4 (CPU), a read-only-memory 5 (ROM) wherein is stored a program or sequence of arithmetic operations and controls to be accomplished by the center processing unit, an accumulator 6 (AR) including memories, a register 7 (BR) for storing data, gates G1 through G6, an instruction signal line La through which is transmitted an instruction signal enabling the accumulator 6 to store data, an instruction signal line Lb through which is transmitted an instruction signal enabling the accumulator 6 to receive the contents in the register 7, an instruction signal line Lc through which is transmitted an instruction signal enabling the accumulator 6 to provide data, an instruction signal line Ld through which is transmitted an instruction signal enabling the register 7 to add its contents to those in the accumulator 6, an instruction signal line Le through which is transmitted an instruction signal enabling the accumulator 6 to transfer its contents into the register 7, an instruction line Lf through which is transmitted an instruction signal enabling the accumulator 6 to shift its contents to the right, an instruction line Lg through which is transmitted an instruction signal enabling the accumulator 6 to shift its contents to the left, and an instruction signal line Lh through which is transmitted an instruction signal enabling the accumulator 6 to transfer four lower digits into the register 7.

One of the novel features of the computer with the above arrangement resides in the fact that regardless of the selection of any of the date input sequence selection positions ① through ④, the entered date data is converted into the sequence of Month—Day—Year in Christian era within the computer before it is operated.

Next the mode of operation of the preferred embodiment will be described below when the selection switch 1 is set to the position ① and the date The 50-th year in Showa, 11-th month and 28-th day is entered by the input device 3 and is converted into 11-th month 28-th day, 1975 year in Christian era in conjunction with Table 1.

TABLE 1

$$\begin{bmatrix} \text{The 50th year in Showa,} \\ \text{11th month and 28th day} \end{bmatrix} \longrightarrow \begin{bmatrix} \text{11th month 28th day,} \\ \text{1975 year in Christian era} \end{bmatrix}$$

| (Operation of Logic Circuit) | (Contents in Accumulator 6) | (Contents in Register 7) | Operating Instruction Signal Lines | Gates |
|---|---|---|---|---|
| (1) Enter "501128" | 0 0 5 0 1 1 2 8 | 0 0 0 0 0 0 0 0 | La | |
| (2) AR ⇄ BR | 0 0 0 0 0 0 0 0 | 0 0 5 0 1 1 2 8 | Lb,Le | G3,G6 |
| (3) "19250000"→AR | 1 9 2 5 0 0 0 0 | 0 0 5 0 1 1 2 8 | Lc | |
| (4) AR + BR→AR | 1 9 7 5 1 1 2 8 | 0 0 5 0 1 1 2 8 | Ld | G2 |
| (5) AR→BR | 1 9 7 5 1 1 2 8 | 1 9 7 5 1 1 2 8 | Le | G3 |
| (6) Shift Four Positions to the Right in AR | 0 0 0 0 1 9 7 5 | 1 9 7 5 1 1 2 8 | Lf | G4 |
| (7) AR ⇄ BR | 1 9 7 5 1 1 2 8 | 0 0 0 0 1 9 7 5 | Lb,Le | G3,G6 |
| (8) Shift Four Places to the Left in AR | 1 1 2 8 0 0 0 0 | 0 0 0 0 1 9 7 5 | Lg | G5 |
| (9) AR + BR→AR | 1 1 2 8 1 9 7 5 | 0 0 0 0 1 9 7 5 | La | G2 |

First, the numeric data "501128" is entered in sequence by depressing numeric buttons of the input device 3. Then in response to the instruction from the central processing unit 4 transmitted through the instruction line La, the data is stored in the accumulator 6 as shown at (1) in Table 1. Upon depression of a date (or Days) key of the input device 3, the central processing unit CPU 4 interprets the selection switch 1 in the status because the flip-flop F1 is in the set state, and delivers various instructions on the instruction lines L in accordance the program sequences stored in the read-only-memory ROM 5 by addressing the leading address thereof for converting the date data in the sequence of the year in Showa, month and day into the date data in the sequence of the month, day and year in Christian era. That is, in response to the instructions transmitted on the instruction lines Lb and Le, Gates G6 and G3 are enabled to cause the accumulator 6 and the register 7 to interchange their contents as shown at (2) in Table 1. In response to the instruction transmitted on the instruction line Lc from CPU 4, the numeric data "19250000" which is generated based on the difference between the year in Christian era and the year in Showa is stored in the accumulator 6 as indicated at (3) in Table 1. In response to the instruction transmitted on the instruction line Ld from CPU 4 the GATE G2 is operated to and in response to the instruction transmitted on the line Ld from CPU 4, GATE G2 is enabled to cause the register 7 to add its contents to those in the accumulator 6 as indicated at (0) in Table 1. Thus the date data "the 50-th year in Showa, 11-th month 28-th day" is converted into the 11-th month 28-th day 1975 in Christian era and is stored in the accumulator 6.

When the selection switch 1 is set to the position ②, the input date data is once stored in the accumulator 6 and then operated in the sequences (5), (6), (7), (8) and (9) shown in Table 1. When the selection switch 1 is set to the position ③ no conversion is made because the numeric data is entered in a predetermined sequence. When the selection switch 1 is set to the position ④, the conversion is made in the sequence shown in Table 2, but this sequence shall not be described because it will be apparent to those skilled in the art from the explanation of the sequence in Table 1.

TABLE 2

[28th day 11th month, 1975 year ⟶ 11th month 28th day, 1975 year]

| (Operation of Logic Circuit) | (Contents in Accumulator 6) | (Contents in Register 7) | (Operating Instruction Signal Lines · Gates) | |
|---|---|---|---|---|
| (1) Enter "28111975" | 2 8 1 1 1 9 7 5 | 0 0 0 0 0 0 0 0 | La | |
| (2) AR ⟶ BR | 2 8 1 1 1 9 7 5 | 2 8 1 1 1 9 7 5 | Le | G3 |
| (3) Shift Six Positions to the Right in AR | 0 0 0 0 0 0 2 8 | 2 8 1 1 1 9 7 5 | Lf | G4 |
| (4) Shift Four Positions to the Left in AR | 0 0 2 8 0 0 0 0 | 2 8 1 1 1 9 7 5 | Lg | G5 |
| (5) AR ⟵⟶ BR | 2 8 1 1 1 9 7 5 | 0 0 2 8 0 0 0 0 | Lb,Le | G3,G6 |
| (6) Lower Four Positions in AR ⟶ BR | 2 8 1 1 1 9 7 5 | 0 0 2 8 1 9 7 5 | Lh | G1 |
| (7) Shift Four Positions to the Left in AR | 0 0 0 0 2 8 1 1 | 0 0 2 8 1 9 7 5 | Lf | G4 |
| (8) Shift Six Positions to the Right in AR | 1 1 0 0 0 0 0 0 | 0 0 2 8 1 9 7 5 | Lg | G5 |
| (9) AR + BR ⟶ AR | 1 1 2 8 1 9 7 5 | 0 0 2 8 1 9 7 5 | Ld | G2 | cause the contents in the register 7 be added to those in the accumulator 6 as indicated at (4) in Table 1. Next in response to the instruction transmitted on the instruction line Le from CPU 4 Gate G3 is enabled to cause the contents in the accumulator 6 to be transferred into the register 7 as indicated at (5) in Table 1. In response to the instruction transmitted on the instruction line Lf from CPU 4, the GATEs G6 and G3 are enabled to cause the accumulator 6 and the register 7 to interchange their contents as indicated at (7) in Table 1. Next in response to the instruction transmitted on the instruction line Lf from CPU 4, GATE G4 is enabled to cause the accumulator 6 to shift its contents by four digit position to the right as indicated at (6) in Table 1. Thereafter in response to the instruction transmitted on the instruction line Lg from CPU 4, GATE G5 is enabled to cause the accumulator 6 to shift its contents by four digit positions to the left as indicated at (8) in Table 1, In summary, the computer in accordance with the present invention is provided with the selection switch for selecting the sequence of the input date data, and in response to the detection of the flip-flop which is in the set state indicating the selected date data input sequence, CPU in the computer addresses the leading address in ROM of a conversion program so that in response to the instructions transmitted on the instruction lines in the programmed sequence the input date data is converted into the date in the sequence of the month, day and year in Christian era. Therefore the computer of the present invention is very advantageous in practice for calculating years, months and days.

Figure 2:
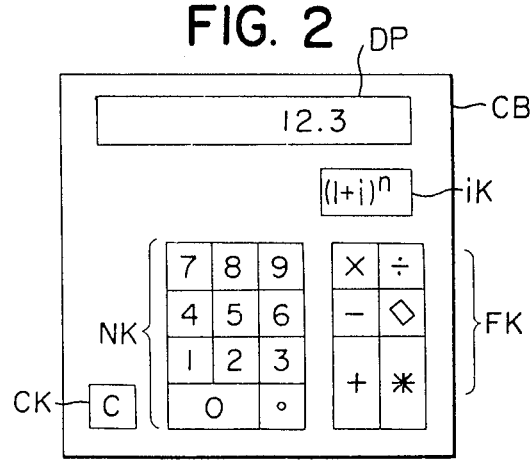
FIG. 2 is a schematic perspective view of a second embodiment of the present invention.
Figure 3:
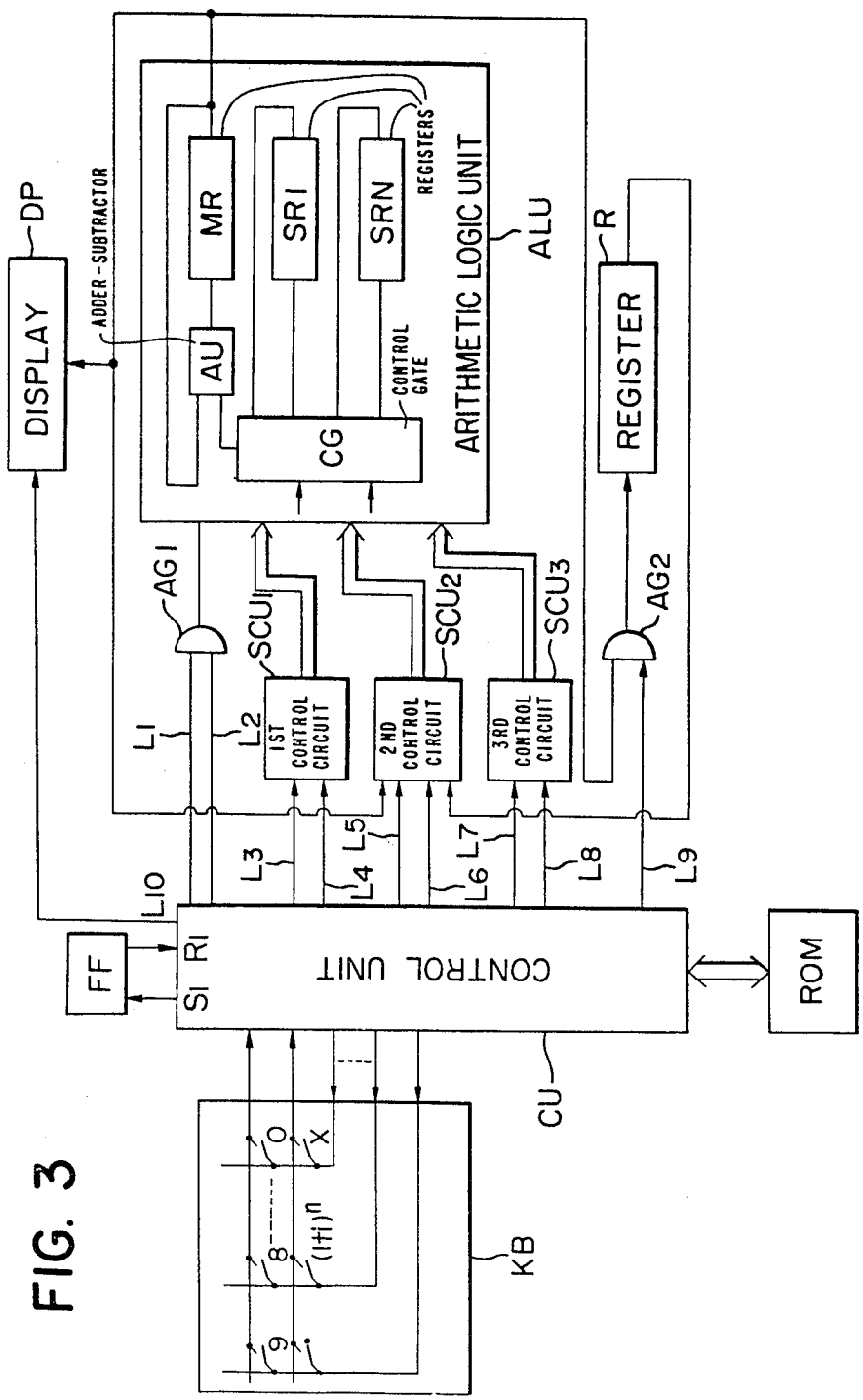
FIG. 3 is a block diagram thereof.

Second Embodiment, FIGS. 2 and 3

FIG. 2 is a top view of a second embodiment of the present invention adapted for obtaining compound interests with as few instructions as possible. It has a main body CB provided with a display device DP at the upper portion, a key iK for initiating the compound interest computation, function keys FK, numeric keys NK and a clear key CK.

In FIG. 3 there is shown in block diagram the computer. Upon depression of the key on the computer, scanning pulses transmitted from a control unit CU are permitted to pass and interrupted by switches closed and opened in the input device KB depending upon the key depressed so that the key signal is transmitted to the control unit CU. The control unit CU interprets the key signal and delivers a coded signal corresponding to the key signal on an output line L1. Upon depression of any of the numeric keys NK, the control unit CU also delivers on an output line a signal enabling an AND gate AG1 to open to transfer the signal on the output line L1 to an arithmetic logic unit ALU.

In response to the depression of the compound interest key iK, CU delivers on an output line S1 a signal enabling a flip-flop FF to be set while reading the contents in a read-only-memory ROM and delivering the read out data on an output line L3. The control unit CU reads from ROM the sequence signals for executing the operation $$\log(1+i)$$

in ALU and delivers them through an output line L4 to a first control circuit SCU1.

The control unit CU delivers a signal through an output line L5 to a second control circuit SCU2 in order to obtain the product of a data in ALU and a data in a register R as will be described in detail hereinafter. The control unit CU reads the sequence instructions stored in ROM and delivers them on an output line L6.

The control unit CU delivers a signal through an output line L7 to a third control circuit SCU3 and reads the sequence instructions stored in ROM for the execution of $10^x$ in ALU and delivers them sequentially through an output line L8 to the third control circuit SCU3.

The control unit CU further delivers on an output line L9 a signal enabling an AND gate AG2 to open to permit the transfer of the data in ALU into a register R2. The control unit CU further delivers on an output line L-10 a signal for controlling the display device DP.

The first control circuit SCU1 interprets the sequence instruction transmitted from ROM to deliver a control signal to ALU so that the data in ALU may be incremented by 1 and the operation $\log(i+1)$ may be executed.

The second control circuit SCU2 interprets the sequence instruction transmitted from ROM and delivers a control signal to ALU so that the product of the data in ALU and the data in the register R may be obtained.

The third control circuit SCU 3 interprets the sequence instruction from ROM to deliver a control signal to ALU to enable it to execute the operation of $10^x$.

The arithmetic logic unit ALU has an adder-subtractor AU, a register MR, a plurality of registers SR1 through SRN and a bank of gates CG for controlling the operations of the registers. These components of the arithmetic logic unit ALU are operated in response to the control signals and data from the first, second and third control circuits SCU1, SCU2 and SCU3.

The display device DP displays the contents of the main register MR.

Next the mode of the operation of the computer with the above construction will be described. First the numeric keys NK are depressed to enter a compound interest i, and the coded numeric data is transmitted from CU through GATE AG1 to and stored in the master register MR in ALU. To discriminate the depression of the compound interest $[(1+i)^n]$ key iK, the control unit CU delivers a set signal through the output line S1 to the flip-flop FF to set it. The control unit CU delivers the control signal through the output line L3 to the first control circuit SCU1 so that the latter may receive from ROM the sequence instructions for the execution of $\log(1+i)$, the sequence instruction being delivered through the output line L4 to SCU1. The first control circuit SCU1 interprets the sequence instructions and delivers the control signal to ALU. As a result, the data i in the master register MR is incremented by 1, the execution of $\log(1+i)$ is initiated with the use of the registers SR1 through SRN, the result is stored in the main register MR and in response to the control signal transmitted through the output line L9 AND GATE AG2 is opened so that the data in the main register MR in ALU may be transferred into the register R. The control unit CU may be so designed and constructed that only after the data has been stored in the register R, the signal for setting the flip-flop FF may be transmitted.

Next the numeric key or keys NK are depressed to enter a term or years N, and as with the case of the entry of the interest data i, the coded term data is stored in the main register MR in ALU.

Upon depression of the compound interest key iK for the execution of $[(1+i)^n]$, the control unit CU discriminates the status of the flip-flop FF through an input line RL, the flip-flop being set, and reads the sequence instruction from ROM and delivers it through the output line L6 to the second control circuit SCU2.

The second control circuit SCU2 interprets the instruction and delivers the control signal to ALU. As a result, the gate bank CG is so controlled as to obtain the product of the data N in the register MR and the data log (Hi) in the register R and the result is stored in the main register MR. Thereafter the control unit CU delivers the control signal on the output line L7 for execution of $10^x$ and delivers the sequence instruction for carrying out $10^x$ through the output line 18 to the third control circuit SCU3.

In response to the sequence instruction, the third control circuit SCU3 delivers the control signals to the gate bank CG so that the exponential calculation may be executed in a well known manner and the result is stored in the main register MR. Thereafter the control unit CU resets the flip-flop FF, and the data in the main register MR is caused to be transmitted to the display device DP to be dynamically displayed in response to the display control signals transmitted through the output line L10 from the control unit CU.

In summary, the second embodiment of the present invention is adapted to immediately obtain a compound interest in a very simple manner with as few entry key depressions as possible.

Third Embodiment, FIGS. 4 through 9

Figure 4:
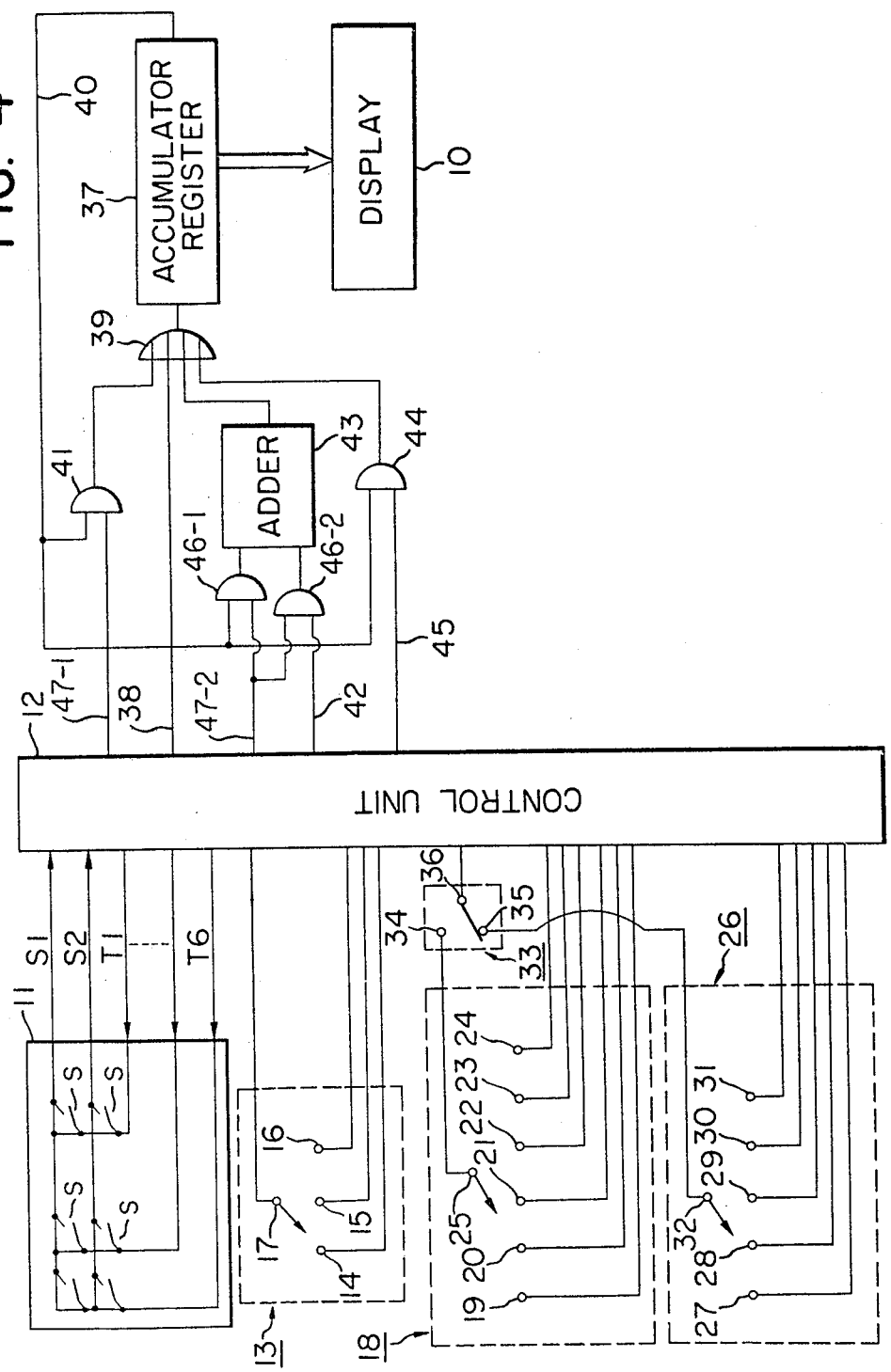
FIG. 4 is a block diagram of a third embodiment of the present invention.

In FIG. 4 there is shown, in block diagram form a third embodiment of the present invention adapted to round, digits below a desired digit position above the decimal point (i.e., treat digits of five and over as one higher unit, and cut off the lower digits, and raise, cut off, truncate or chop digits). Numeric and other function data are entered with a keyboard 11 wherein timing pulses T1 through T6 transmitted from a control unit CU 12 are passed and interrupted by switches S to produce a key signal which is transmitted through signal lines S1 and S2 to the control unit CU 12.

A mode selection unit 13 is provided with stationary contacts 14, 15 and 16 and a movable contact 17, and when the contact 14 is closed, a raise mode signal is transmitted to CU. In like manner, when the contact 15 or 16 are closed, a rounding mode or truncation or chopping mode signal is transmitted to CU.

A first indicator 18 is provided in order to indicate digits below the decimal point and has stationary contacts 19 through 24 and a movable contact 25. When the movable contact 25 closes the contact 19, floating is indicated, and when the movable contact 25 closes the contact 20, 21, 22, 23 or 24, the first, second, third, fourth or fifth digit position below the decimal point may be indicated.

A second indicator 26 in accordance with the present invention is provided for indicating a digit position above the decimal point, and has stationary contacts 27 through 31 and a movable contact 32. When the movable contact 32 closes the contact 27, 28, 29, 30 or 31, the first, second, third, fourth or fifth digit position above the decimal point is indicated to CU 12.

The movable contacts 25 and 32 in the first and second indicators 13 and 26 are connected to stationary contacts 34 and 35, respectively, of a switch 33 and are selectively closed with a movable contact 36 so that the output from either of the first or second indicator may be transmitted to the control unit 12.

The numeric data entered by the keyboard 11 is operated and the result is transferred through a signal line 38 and an OR gate 39 into an accumulator 37. The method for storing an operation data in the accumulator 37 has been well known in the art of computers so that in the following description it is assumed that an operation data has been already stored in the accumulator 37.

The contents in the accumulator 37 are circulated through a loop consisting of a signal line 40, an AND gate 41 and OR gate 39 and an adder 43 adds the contents in the register 37 to a numeric data transmitted through a signal line 42 and the sum may be stored in the register 37. Furthermore, in response to a signal transmitted through a signal wire 45 and an AND gate 44, a digit in a selected digit position in the register 37 may be changed to "0". The "change-to-zero" mode as well as the above described modes may be accomplished by raising a signal on a wire 45, 47-1 or 47-2 to a high level, the lines 45, 47-1, 47-2 being connected to AND gates 41, 46-1 and 46-2, and 44, respectively. That is, the high-level signal is transmitted to AND gate 41 so that the data in the register 37 may be circulated, and when a certain mode is selected by the indicator and the selection unit 17 one of the numeric data shown in FIG. 9 is transmitted through the line 42 while the high-level signal is transmitted through the signal line 42 and the low-level signals, through the signal lines 45 and 47-1 so that the addition may be executed. After addition, transmitted through the signal line 45 is a signal which may remain at low level after a predetermined digit position in the register 37 (the low-level signals being transmitted through the signal lines 47-1 and 47-2) so that the digits below the predetermined digit position; that is, those in the digit positions at which the signal remains at low level are forced to change to "0s".

Therefore the control unit 12 must be so designed and constructed that it may output the numeric data shown in FIG. 9 in response to the status of the selection unit 13 and the first and second indicators 18 and 26. To this end, the numeric data shown in FIG. 9 are previously stored in a memory and the control unit 12 is so designed and constructed to read a suitable numeric data from the memory depending upon the status of the selection unit 13 and the first and second indicators 18 and 26 and transmit the read out numeric data.

Figure 5:
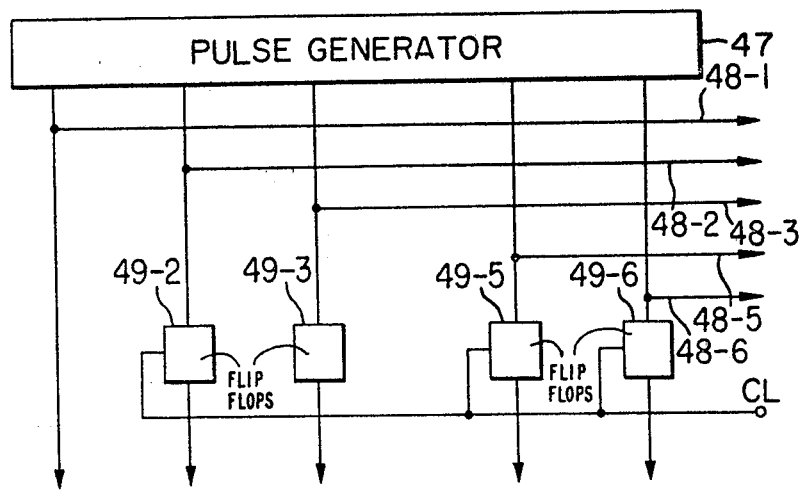
FIG. 5 is a block diagram of a digit pulse generator and its associated parts.
Figure 6:
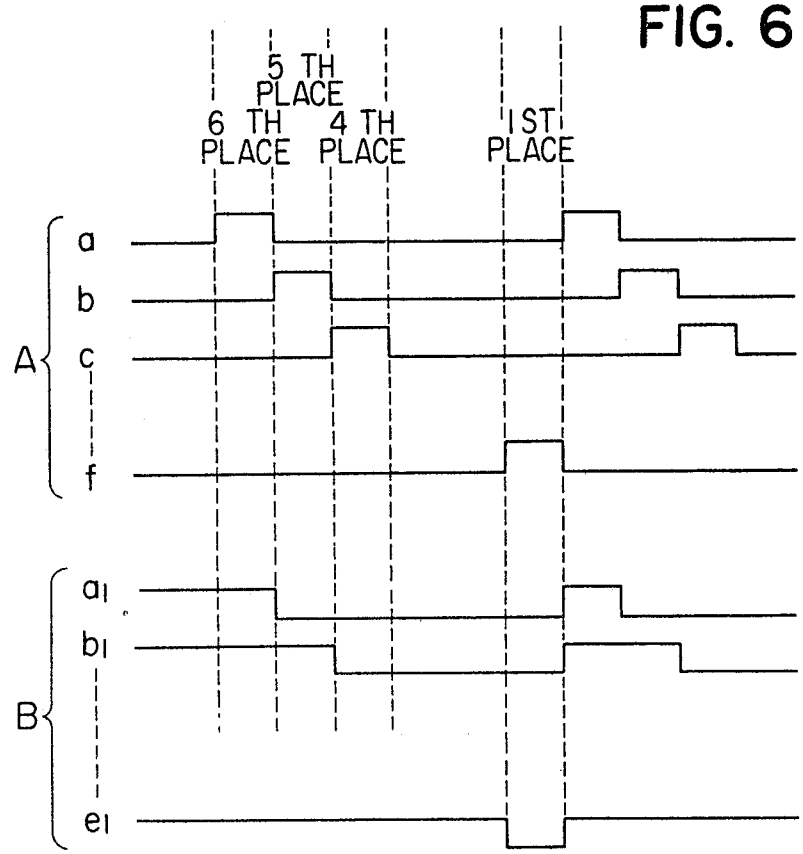
FIG. 6 shows waveforms of signals at various points in the block diagram shown in FIG. 4.

The control unit 12 includes a pulse generator 47 as shown in FIG. 5. As with the digit pulse generators in the conventional computers, the pulse generator 47 generates digit position pulses a through f as shown in FIG. 6-A, the pulses being transmitted through output lines 48-1 through 48-6 and applied to flip-flops 49-2 through 49-6. The flip-flops 49-2 through 49-6 are set in response to the leading edges of the pulses a through f and are reset or cleared at the trailing edges of the pulses f in response to a clear signal transmitted from a clear signal terminal CL. The outputs from the flip-flops 49-2 through 49-6 are inverted to derive signals $a_1$ through $e_1$ as shown in FIG. 6-B.

Figure 7:
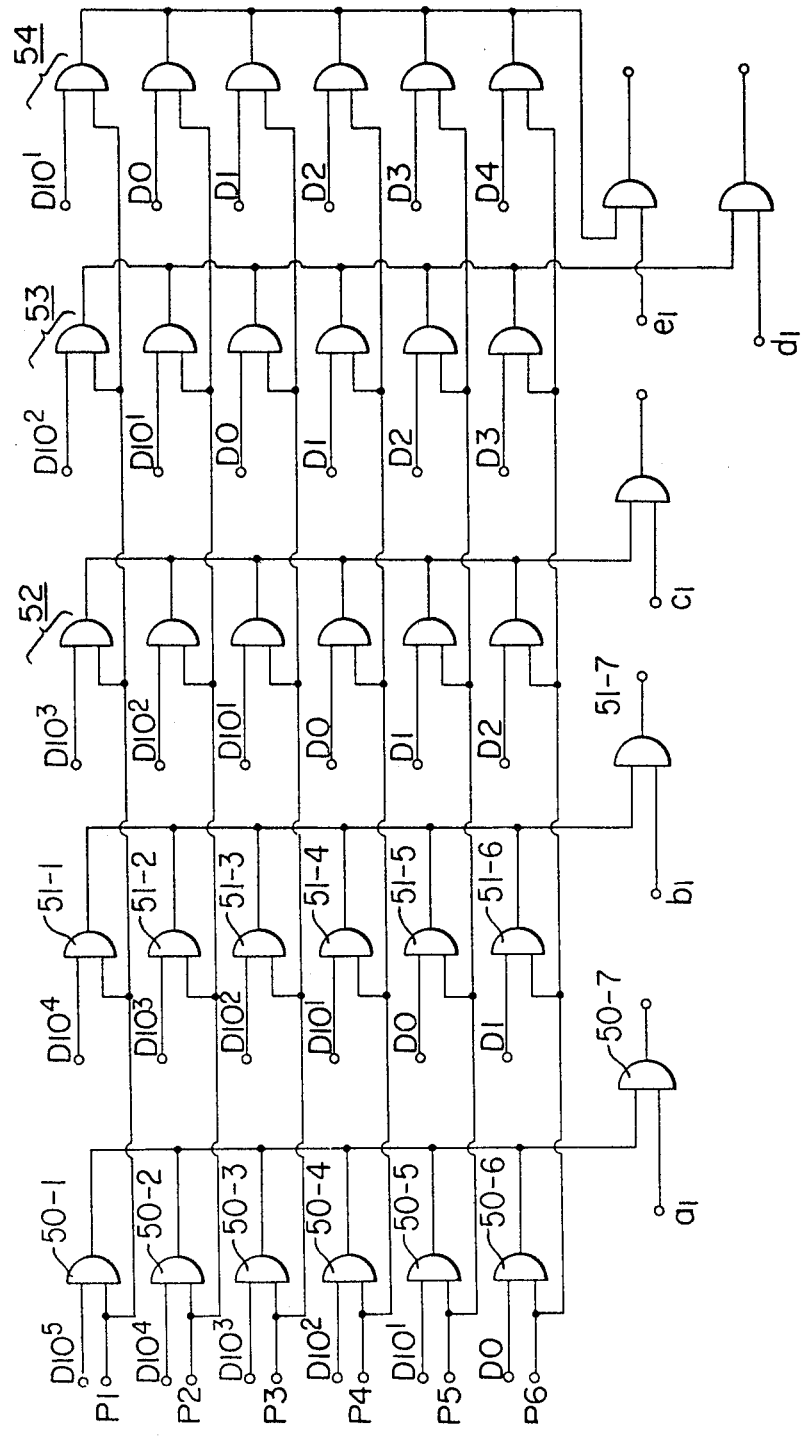
FIG. 7 is a diagram of a gate circuit for deriving a signal to be transmitted on a signal line 45.

As with the conventional computers, the control unit 12 includes a decimal point counter for indicating the digit position of the decimal point in the register 37. By a combination of one of the decoded outputs P1 through P6 from the decimal point counter and the output from the first or second indicator, one of the signals $a_1$ through $e_1$ is selected and transmitted. That is, when the decimal point counter indicates that the decimal point must be the first or least significant digit position in the register 37, the output signal P1 is derived. When the decimal point is at the second digit position, the output P2 is derived and so on. When $D10^5$, P1; $D10^4$, P2; $D10^3$, P3; $D10^2$, P4; $D10^1$, P5; and/or D0 and P6 are simultaneously derived as shown in FIG. 7, AND gates 50-1 through 50-7 are opened to derive the signal $a_1$. In like manner, when $D10^4$, P1; $D10^3$, P2; $D10^2$, P3; $D10^1$, P4; D0, P5; and/or D1, P6 are simultaneously derived, AND gates 51-1 through 51-7 are opened to derive the signal $b_1$. In like manners, three groups 52, 53 and 54 of AND gates are provided to derive the signals $c_1$, $d_1$ and $e_1$, respectively.

Referring back to FIG. 4, rounding, raising or truncating or chopping is to be made at a digit position higher than the decimal point, the rounding, raising or truncating or chopping mode is selected by the selection unit 13 and thereafter the movable contact 36 of the switch 33 closes the contact 35 to connect the second indicator 26 to the control unit 12. Thereafter the movable contact 32 of the second indicator 26 closes the contact 27, 28, 29, 30 or 31.

For instance, it is assumed that the contact 27 be closed with the movable contact 32, the operation data 123.456 be stored in the accumulator or register 37, the high-level signal be transmitted through the signal line 47-1 so that the contents in the register 37 are circulating and the movable contact 17 of the selection unit 13 close the contact 15. Therefore the numeric data "5" is transmitted through the signal line 42, and in response to the detection by first storage detection means within CU 12 of the contents in the register 37, the adder 43 is enabled to add the numeric data "5" on the signal line 42 to the contents "123.456" in the register 37 and the sum 128.456 is stored in the register 37.

Upon detection by a second storage detection means in CU 12 of the storage of the sum into the register 37, the output from AND gate 51-3 is applied to AND gate 51-7 (See FIG. 7) so that the signal $b_1$ is selected and transmitted on the signal line 45.

As shown in FIG. 6-B, the signal $b_1$ remains at high level for a time interval corresponding to the highest and next highest digit positions of the register 37, the digits in the lower four digit positions of the operation data circulating through the loop of the register 37, the signal line 40, AND gate 44 and OR gate 39 are forced to change into "0s". That is, the data "128.456" is changed to "120.000", and is stored in the register 37.

Upon the detection of this storage by a third storage detection means in CU 12, the high-level signal is applied only to AND gate 41 so that the data "120.000" is circulated and displayed on the display device 10.

In summary, according to the third embodiment of the present invention the second indicator is provided for rounding, raising or truncating or chopping digits in the digit positions higher than the decimal point so that rounding, raising or truncating or chopping may be accomplished in an extremely simple manner.

So far the first and second indicators have been described as being provided independently of each other, but it will be understood to those skilled in the art that they may be combined into a unitary switch.

What we claim is:

1. A computer comprising:
a keyboard including an instruction key for instructing the initiation of a compound interest computation, and including a plurality of numeric keys for entering numeric data into the computer;
memory means responsive to first and second operations of said instruction key for respectively storing first status information and second status information;
first controlling means coupled to said memory means for processing numeric data representing an interest rate i which is entered into the computer through said numeric keys as a result of storing said first status information in said memory means;
second controlling means coupled to said memory means for processing numeric data representing a time period n which is entered into the computer through said numeric keys as a result of storing said second status information in said memory means; and
means for controlling the execution of said compound interest computation in accordance with the term $(1+i)^n$ utilizing said numeric data representative of said interest rate and said numeric data representative of said timer period processed respectively by said first and second controlling means.

2. A computer as set forth in claim 1, wherein said first controlling means comprises means for replacing said first status information stored in said memory means with said second status information.

3. A computer as set forth in claim 1, wherein said second controlling means comprises means for replacing said second status information with said first status information.

4. A computer as set forth in claim 1, wherein said first controlling means comprises means for executing a logarithmic operation on the result obtained from the addition of one to said numeric data.

5. A computer as set forth in claim 4, wherein said second controlling means comprises means for executing the product of said numeric data representative of said time period and the result of said logarithmic operation.

6. A computer comprising:
input means including a compound interest rate instruction key, and a plurality of numeric keys for entering numeric data into the computer;
memory means for storing information representative of a first-time and a second-time operation of said compound interest rate key; and
processing means, responsive to entry of said numeric data, for processing said numeric data as an interest rate i, when said stored information is representative of the first-time operation, and for processing said numeric data as a time period n, when said stored information is representative of the second-time operation, and wherein said processing means processes a compound interest computation in accordance with the term $(1+i)^n$ by utilizing said entered numeric data representing said time period and said entered numeric data representing said interest rate.

7. A computer as set forth in claim 6, wherein said processing means includes means for changing said information of said means when said compound interest rate key operation is identified as the first-time key operation.

8. A computer as set forth in claim 7, wherein said processing means includes means for storing a first result obtained from processed numeric data representing said time period and a second result obtained from processed numeric data representing said interest rate.

* * * * *